United States Patent [19]

Beck et al.

[11] Patent Number: 4,610,267
[45] Date of Patent: Sep. 9, 1986

[54] FAST RESPONSE SOLENOID VALVE

[75] Inventors: Niels J. Beck; Edward T. Gilbert, both of Bonita; William E. Weseloh; Kenneth Rudolph, both of San Diego, all of Calif.

[73] Assignee: Orshansky Transmission Corporation, San Diego, Calif.

[21] Appl. No.: 411,298

[22] Filed: Aug. 25, 1982

[51] Int. Cl.⁴ .................... F16K 51/00; F16K 31/02
[52] U.S. Cl. .................... 137/329.3; 251/129.14; 251/129.15; 137/625.17; 137/596.17; 137/864; 137/901
[58] Field of Search ........... 251/129, 132, 141, 138, 251/77; 137/864, 870, 625.17, 596.17, DIG. 2, 454.5, 329.3; 335/278

[56] References Cited

U.S. PATENT DOCUMENTS 1,206,216 11/1918 Gray .................... 137/DIG. 2
1,702,580 2/1927 Thaete .................... 137/329.3
4,391,292 7/1983 Millar .................... 137/596.17

FOREIGN PATENT DOCUMENTS 2951232 7/1981 Fed. Rep. of Germany .................... 137/596.17

543767 5/1956 Italy .................... 137/596.17

Primary Examiner—William E. Lyddane
Assistant Examiner—Gerald A. Anderson
Attorney, Agent, or Firm—Owen, Wickersham & Erickson

[57] ABSTRACT

A fast-response solenoid valve. A three-way form has a body with three successive separated openings interconnected by a linear fluid pathway having two chambers lying between successive pairs of openings, each with a movable ball and a ball seat in respective ball cages. Each cage has a cylindrical exterior wall in snug engagement with the wall of the linear fluid passageway, a seat at one end, and a tanged retainer portion at the other end, so that each ball is retained in its cage for limited axial movement between its seat and its tanged portion. A cylindrical non-magnetic tube is aligned with the linear fluid pathway, one end of the tube abutting a portion of the body. A non-magnetic end plug is held at a fixed position at the distal end of the tube, and a magnetic guide plug is held at a fixed position in the tube spaced away from the end plug. A solenoid plunger is in said tube, movable in between the two plugs and in connection with a plunger pin that engages one of the balls. There is also a two-way valve form.

19 Claims, 14 Drawing Figures

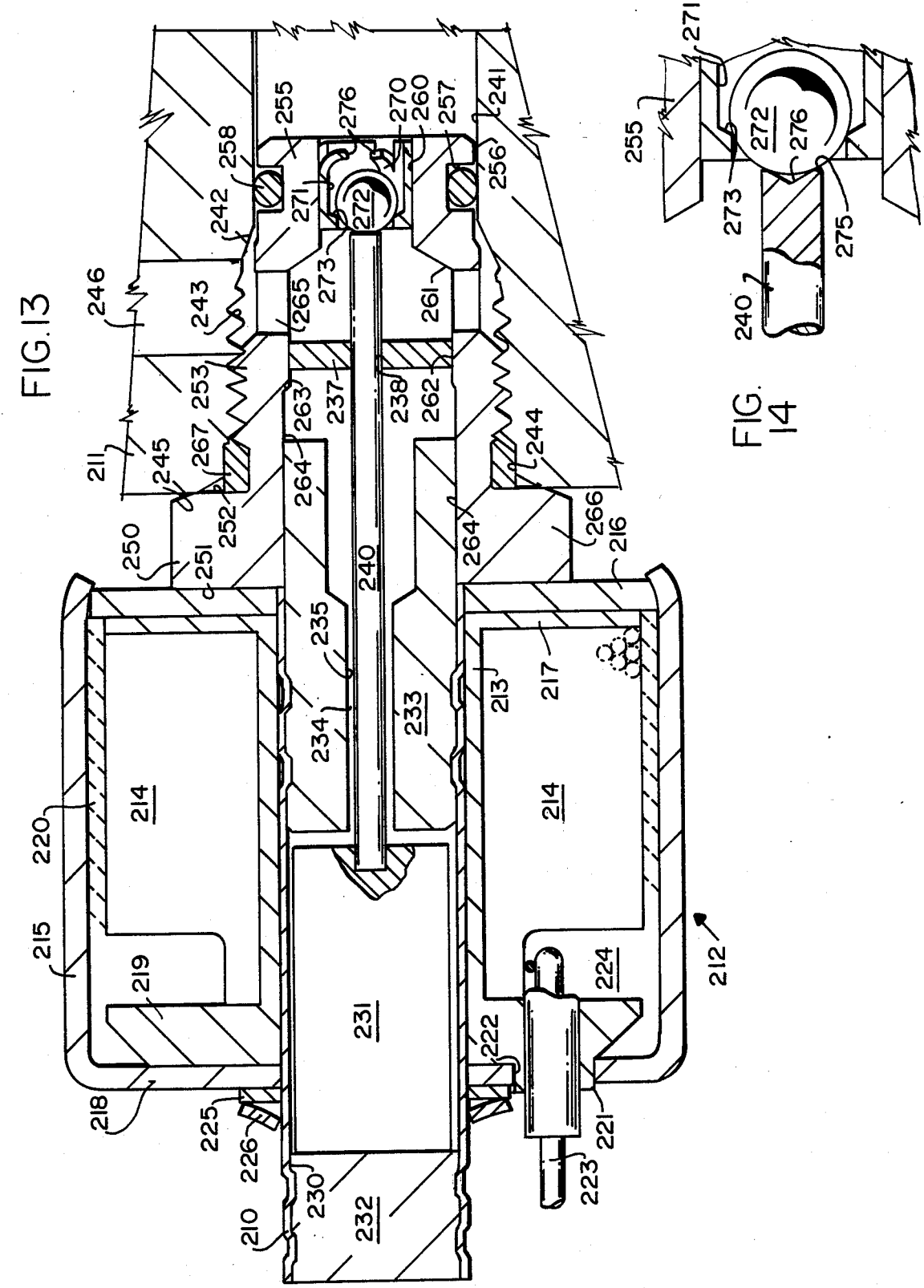

FAST RESPONSE SOLENOID VALVE

This invention relates to a fast-response solenoid valve. This valve is an improvement and extension over that described in application Ser. No. 172,661 filed July 28, 1980, which was a continuation-in-part of application Ser. No. 159,469 filed June 16, 1980, and is now U.S. Pat. No. 4,391,292.

BACKGROUND OF THE INVENTION

Like the valve in application Ser. No. 172,661, the present invention comprises a solenoid-operated cartridge valve for controlling the flow of a fluid with respect to a plurality of openings. It may, like that valve, be embodied as a three-way valve with two operating positions, one enabling fluid flow between the first opening and the second opening, and another which enables fluid flow between the second opening and the third opening. Another similarity is that there are normally open and normally closed forms of the invention, and the valve is readily convertible from one form to the other: first, a normally-open solenoid valve, in which fluid flow is directed between the third opening and the second opening when the solenoid is unactuated; and, second, a normally-closed solenoid valve, in which fluid flow is directed between the second opening and the first opening when the solenoid is unactuated. In both of these forms of the invention the alternate operating position is achieved when the solenoid is actuated, and both forms employ a similar overall design having a linear axial fluid passageway with two ball valves separated by a pin, with one opening lying between the valves and the other two openings at the two opposite ends of the valve.

However, there are important differences between the present invention and the earlier one, especially in the ball seat configuration and in the solenoid configuration. Also, the present invention may be applied to a two-way valve.

SUMMARY OF THE INVENTION

This rapid-response, solenoid valve has a valve housing with a hollow interior that provides successively wider cylindrical bores. In its three-way form, for example, a first bore provides an axial opening at one end of the housing, and first and second radial passages lead respectively from second and third bores. The third bore includes a threaded portion.

Inside the valve housing is a cylindrical valve body with a hollow interior and an exterior wall stepped to provide successively wider first, second, and third portions and a head. The first and second portions are only slightly smaller in diameter than the first and second bores, and they each carry sealing means for sealing against their respective bores. The third portion is in threaded engagement with the threaded portion of the third bore, and they are sealed to prevent leakage between them.

The first body portion extends from the first bore into the second bore to provide a first annular space between the body and the housing and also in between the two sealing means. This first annular space communicates with the first radial passage. There is a third radial passage leading from the hollow interior of the valve body into this first annular space.

The second body portion similarly extends from the second bore into the third bore to provide there a second annular space communicating with the second radial passage, and there is a fourth radial passage leading from the hollow interior of the valve body into the second annular space.

The hollow interior of the three-way valve body has a first axial passage leading into the axial opening, and it is from this first axial passage that the first radial passage leads. A second axial passage in the body widens out from the first axial passage, and from this second axial passage the second radial passage leads. A third still wider axial passage is joined to the second axial passage by an annular step.

First and second ball cages are located at opposite ends of the first axial passage and on opposite sides of the first radial passage. Each cage has a cylindrical exterior wall in snug engagement with the wall of the first radial passage. The cage also has a seat at one end and a tanged retainer portion at the other end. The seats of the two cages face in opposite directions. First and second balls are respectively in the first and second cages and are retained by them there for limited axial movement between a seat and a tanged portion.

A separator pin in the first axial passage is in between the balls and bears on both of the balls. A separator pin guide means is in and bears on the wall of the first axial passage; it holds the pin in correct alignment.

A cylindrical non-magnetic tube has an outer wall and has an inner wall the same diameter as the third axial passage. One end of this tube abuts the head of the valve body, and the tube is axially aligned with the body. A non-magnetic end plug is held at a fixed position at the distal end of this tube, while a magnetic guide plug is held at a fixed position in the tube, spaced away from the end plug; this guide plug has a small-diameter passage therethrough. Also in the tube is a solenoid plunger located movably in between the two plugs. In connection with the plunger is a plunger pin that extends through the passage in the plug into contact with the second ball.

A coil bobbin having a cylindrical annular portion is in snug contact with the outer wall of the tube and has first and second radial flanges at its ends. Between the first flange and the head of the valve body is a flat annular washer, which is in firm engagement with the first flange. A solenoid coil is wound around said bobbin in between its flanges, and its leads extend out through the second flange. A hollow spacer abuts the second flange and has hollow protrusions on the side opposite from the second flange, through which the leads pass. A tubular casing has a cylindrical portion extending from the washer to and beyond the second flange and there is radially interned to provide a third flange. A flat washer and a flat spring cooperate to provide retaining means for retaining the third flange in engagement with the spacer and the spacer in engagement with the second flange, thereby holding the assembly together.

Other objects and advantages of the invention will appear from the drawing and from the description which follows.

BRIEF DESCRIPTION OF THE DRAWINGS

FIG. 13 is a view generally like FIG. 1 of a two-way valve embodying the principles of the invention.

FIG. 14 is a fragmentary view in section of the end of the plunger pin which engages a ball.

DESCRIPTION OF SOME PREFERRED EMBODIMENTS

A Three-Way Valve (FIGS. 1–5)

Figure 1:
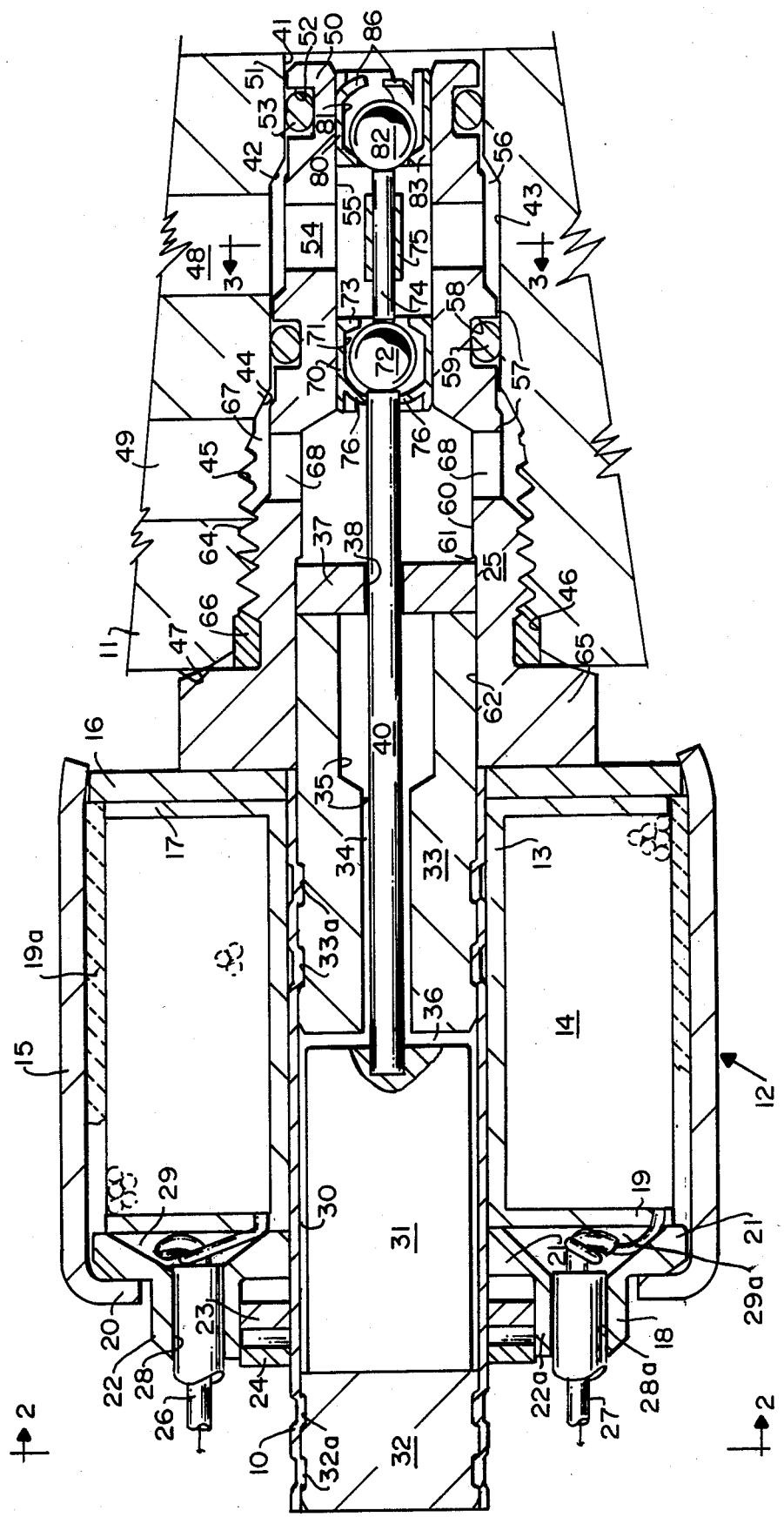
FIG. 1 is a view in longitudinal cross section, taken along the line 1—1 in FIG. 2, through a normally closed three-way valve and solenoid embodying the principles of the invention. Part of the valve housing is broken away in order to conserve space.

The normally closed valve of FIGS. 1 to 5 includes a cylindrical tube 10 of non-magnetic material and a valve housing 11, most of which has been broken away. Around the tube 10 is a solenoid 12 comprising a non-magnetic coil bobbin 13, around which is wound a coil 14, the bobbin 13 and coil 14 being encased in a thin-walled cylindrical steel casing or cover 15. There may be from about two hundred to several thousand winds of the core wire.

Figure 2:
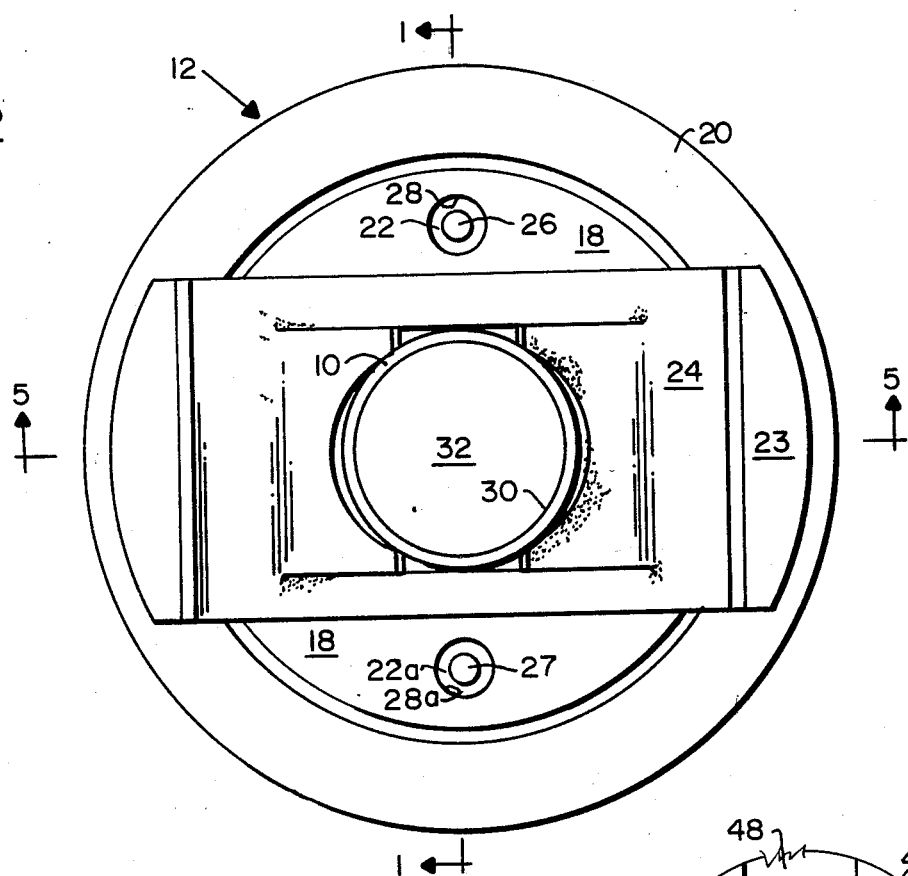
FIG. 2 is a view in end elevation of the solenoid assembly, looking toward FIG. 1 from the left.
Figure 3:
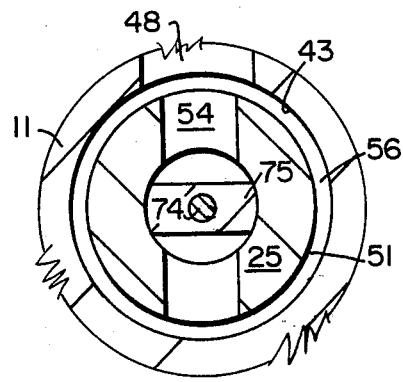
FIG. 3 is a view in section through the separator pin, taken along the line 3—3 in FIG. 1.

The solenoid 12 also includes a washer 16 at one end, abutting a vertical flange 17 of the coil bobbin 13 and a shaped spacer 18 abutting another vertical flange 19 of the coil bobbin 13. Rotational slippage between the casing 15 and the washer 16 is prevented by friction and by adhesion provided by a potting compound 19a that is used to bond the component parts together. The potting compound 19a also hermetically seals the coil assembly and protects it from vibration, moisture and other contamination; further, it provides improved heat transfer from the coil 14 to the casing 15. The spacer 18 is held in place with the aid of a radially inturned wall 20 of the casing 15, which may be formed by rolling over one end of the casing 15. The spacer 18 is shaped to provide a wider annular portion 21 abutted against the flange 19 and a pair of narrower protrusions 22 and 22a, both of which are hollow and are shaped as chordal segments. Between the two protrusions 22 and 22a and the tube 10 are a flat-sided washer 23 and a spring-type retainer 24. As can be seen in FIG. 2, the washer 23 is generally rectangular with arcuate ends bearing on the wall 20 of the casing 15. At locations at right angles to the section shown in FIG. 1, see FIG. 5, the retainer 24 bears against the washer 23 and forces it against the wall 20 of the casing 15, and it also grips the tube 10 so as to hold the entire solenoid assembly together and against a valve body 25. Insulated lead wires 26 and 27 from the coil 14, their connection to the coil 14 being in the wider portion 21, extend through respective openings 28 and 28a in their respective protrusions 22 and 22a, which extend beyond the casing 15. The openings 28 and 28a have enlarged interior portions 29 and 29a respectively which contain the connections between the lead wires 26 and 27 and the coil 14. Typically, the coil wire gauge is much lighter than that of the lead wires 26, 27. The enlarged openings 29 and 29a provide a cavity for a solder joint for the wires and coact with the solder joint to provide a strain relief for the coil wire.

The non-magnetic tube 10 has a central passage 30. A plunger 31 is movable in the central passage 30 between a non-magnetic, stationary end plug 32 seated at the end of the passage 30 and a magnetic guide plug or pole piece 33 adjacent to but spaced apart from the plunger 31. When the solenoid 12 is de-energized, there is a space between the plunger 31 and the guide plug 33, which is at least the length of the stroke of the plunger 31. The guide plug 33 has an axial passage 34 therethrough, and this has a wider portion 35.

In assembly, the guide plug 33 is pushed into the valve body 25 and is held in place by the tight fit with the valve body 25. The plug 33 is pushed into the body 25 for such a distance that an air gap 36 can be controlled within the necessary limits after final assembly. The end plug 32 is pushed into the tube 10 to a position determined by a tooling fixture. The tube 10 is then swaged to hold the end plug 32 in place. A sub-assembly is meanwhile made of the plunger 31 and a plunger pin 40, and this sub-assembly is put in place with the plunger pin 40 placed inside the guide plug 33 and extending through a passage 38 through a pin guide 37. The tube 10 is then pushed over the guide plug 33 and is swaged or roll-crimped in the area of guide plug grooves 32a and 33a.

The construction as described so far is easily manufactured and therefore reduces the manufacturing costs of the solenoid portion of the valve assembly and provides accurate control of critical dimensions, especially the accurate control of the air gap 36. The spring retainer 24, a common commercial part, such as a Tinnerman standard push-on fastener takes up all the axial clearances and loads all the coil parts against the valve body 25.

A pin guide 37 is preferably pressed in place at the same time as the guide plug 33. This pin guide 37 has a passage 38, which guides a plunger pin 40. If desired, the pin guide 37 may be omitted and the guide passage 34 made longer with somewhat closer tolerances to provide for proper guiding of the plunger pin 40. However, the pin guide 37 has the advantage of eliminating the necessity of drilling long small-diameter holes.

The valve housing 11 has a hollow interior comprising a smooth cylindrical bore 41 (at the right of FIG. 1), which is connected by a frustoconical portion 42 to a wider smooth cylindrical bore 43. The bore 43 is connected by a frustoconical portion 44 to a wider interiorly threaded portion 45. Beyond that is a seal cavity portion 46, leading to an end wall 47 of the housing 11. A radial passage 48 leads into and out from the bore 43, and another radial passage 49 leads into and out from the threaded portion 45. The bore 41 provides an axial passage.

The valve body 25 fits into the hollow interior of the valve housing 11. A forward portion 50 of the body 25 has an exterior wall 51 slightly smaller than the bore 41 of the housing 11. This portion 50 is provided with a circumferential groove 52 for an O-ring 53 that seals against the bore 41.

The forward portion 50 is also provided with a pair of passages 54 that lead from a smooth cylindrical bore 55 of the body's hollow interior into an annular space 56 between the wall 51 and the bore 43 of the housing 11. A wider exterior wall 57 fits more closely in the bore 43 and has a circumferential groove 58 for a sealing O-ring 59. Thus, the passages 54 lie between the sealing O-rings 53 and 59 and are preferably in general axial alignment with the passage 48.

The interior of the body 25 widens into a bore 60 which is joined by a shallow shoulder 61 to a bore portion 62, within which the pin guide 37 and the guide plug 33 fit snugly, the bore portion 62 having a diameter equal to that of the central passage 30 of the tube 10. The valve body 25 also has exterior threads 64 that engage the threads 45 of the housing. A keyed head 65 lies between the washer 16 and the housing 11 and may engage the shoulder 47. The head 65 may be hexagonal, and there is enough space between the washer 16 and the shoulder 47 to insert a wrench that engages the head 65 for completing installation of the body 25 in the housing 11. A seal 66, preferably an O-ring fits in the space 46 between the head 65 and the threads 64 insuring sealing, so that there is no leakage between the body 25 and the housing 11 from an annular space 67 around passageways 68 that lead to the passage 49.

The solenoid 12 acts on the valve mechanism via the plunger pin 40, which is pressed into and forms a solid assembly with the plunger 31. The plunger pin 40 extends into the axial linear fluid passageway provided by the bore 60 in the valve body 25. Within the bore 55 are first and second ball valve cages 70 and 80 containing respective cavities 71 and 81 in which are located the first and second balls 72 and 82. Each ball cage 70, 80 provides a valve seat 73, 83 (facing in opposite directions) against which its respective ball 72, 82 may be sealingly engaged. Thus, force due to solenoid energization applied through the plunger 31 and the plunger pin 40 to the ball 72 forces the ball 72 against the seat 73, thereby stopping flow of fluid past the engaged valve seat 73. Similarly, the ball 82 of the other ball cage 80 is forced against its valve seat 83 by pressure from fluid flow applied to the ball 82 to stop the flow of fluid past the valve seat 83.

Disposed between the balls 72 and 82 in the passageway 55 is a separator pin 74 which bears upon both of the balls 72 and 82. The separator pin 74 is guided by a separator pin guide 75, which is shown in cross section in FIG. 3 to show how it is positioned and how it retains the separator pin 74.

The ball cages 70 and 80 are identical parts, each of them having tangs 76 and 86 which respectively act to restrain the movement of the balls 72 and 82 within a short distance in the cavities 71 and 81 and thereby serve to simplify assembly. Thus, the ball 72 or 82 is put in before the tang 76 or 86 is finished and, once the tang 76, 86 is completed, the ball 72 or 82 is restricted in its motion by the pin 74 and by its valve seat 73 or 83. When the ball 72 is pushed off its seat 73 by the separator pin 74, it is restricted in its motion and is kept in close proximity to the seat 73 by its tangs 76.

Figure 4:
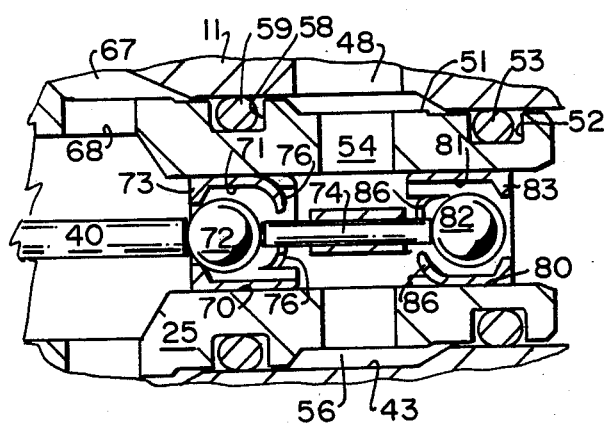
FIG. 4 is a cross-sectional view similar to a portion of FIG. 1, of a portion of a modified form of three-way valve also embodying the principles of the invention, but being normally open, instead of normally closed.
Figure 5:
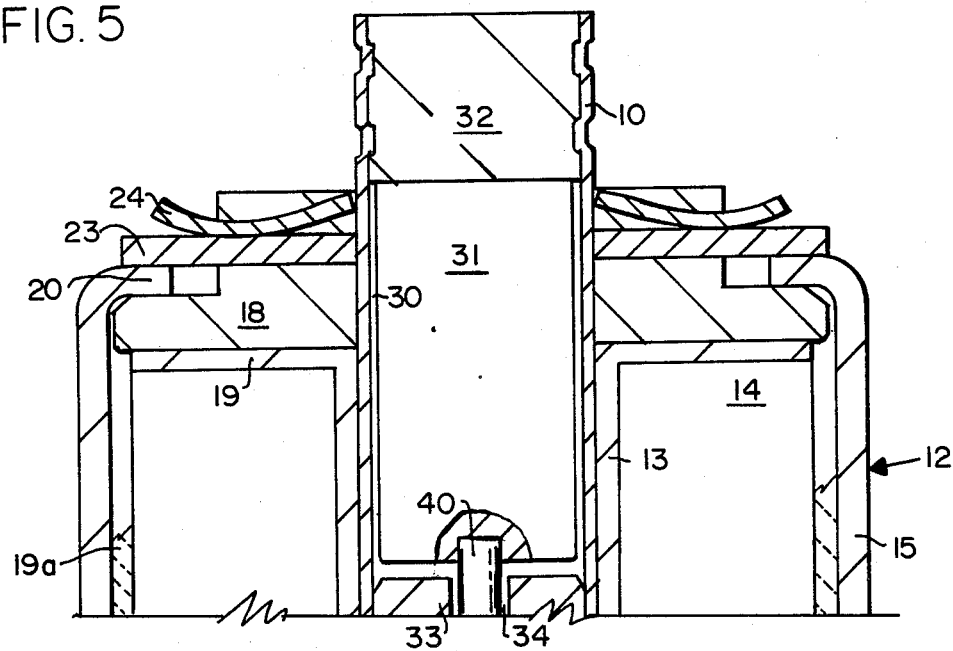
FIG. 5 is a fragmentary view in section, taken along the line 5—5 in FIG. 2, broken off rather than repeating parts that would be shown substantially identical to FIG. 1.

FIG. 4 shows a normally open version of the valve in which the directions of the ball cages 70 and 80 are reversed. It is not necessary to change our parts in order to convert the valve from a normally open type to a normally closed type. All that is done is turn the ball cages 70 and 80 around, and the proper relationships between parts are maintained by installing the two ball cartridges in the proper locations.

Figure 6:
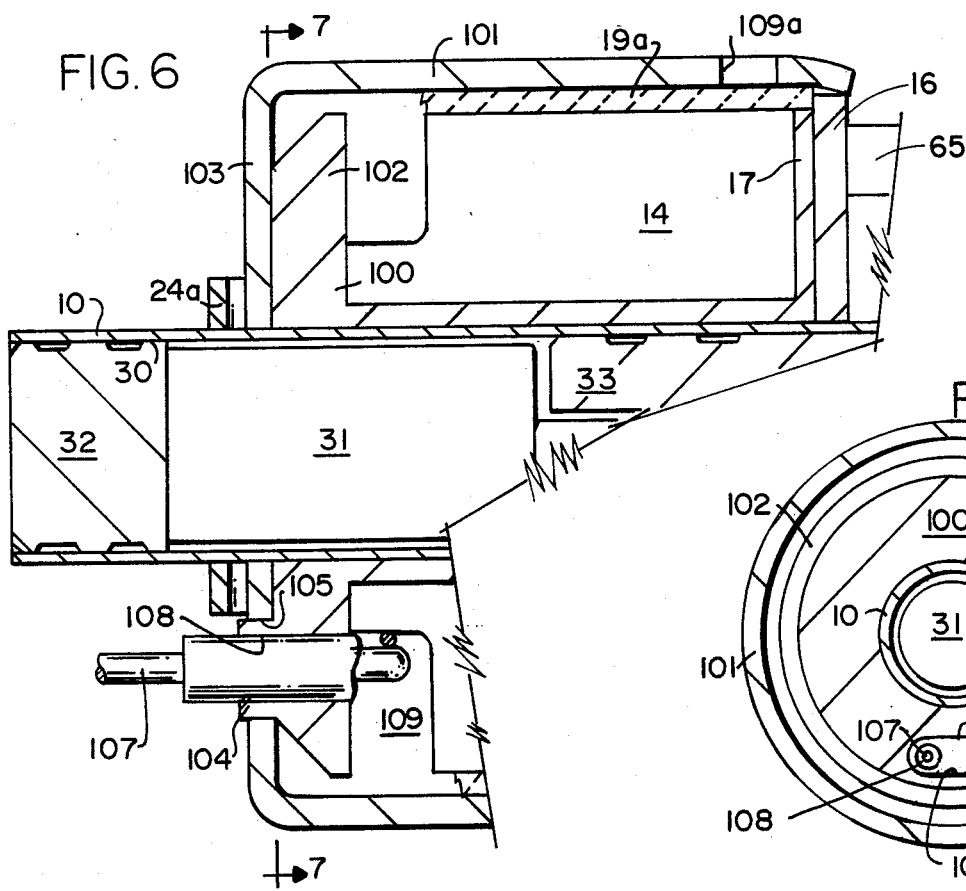
FIG. 6 is a view similar to FIG. 5 of a modified portion of a solenoid-valve combination also embodying the principles of the invention.
Figure 7:
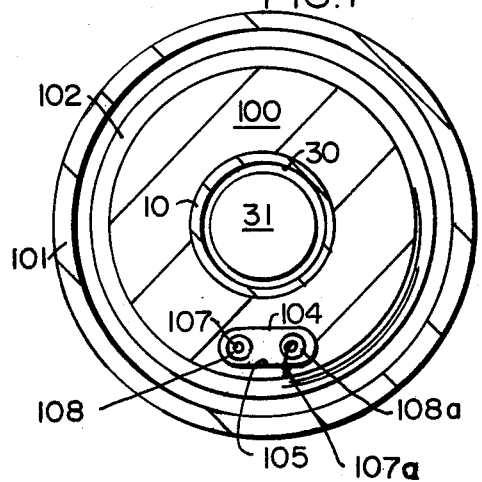
FIG. 7 is an end view, on a reduced scale, taken along the line 7—7 of FIG. 6.

The Modification of FIGS. 6 and 7

FIGS. 6 and 7 show a device with a modified form of coil bobbin 100 around which the coil 14 is wound. This particular embodiment requires no spacer between the coil bobbin 100 and the walls of its casing 101. The coil bobbin 100, which may be of unfilled polysulfone or other suitable non-magnetic material, has a thick flange 102 which abuts a radial inwardly extending flange 103 of the casing 101. At its opposite end, the casing 101 is deformed to assist in holding the core assembly together. An extension 104 of the coil bobbin 100 protrudes through an opening 105 through the casing flange 103 and assures alignment. FIG. 6 shows a relieved area 109 of the coil 14. The connections of insulated lead wires 107 and 107a to the coil 14 are within the relieved area 109. From there, the insulated lead wires 107 and 107a extend through respective openings 108 and 108a. An opening or slot 109a in the cylindrical wall of the casing 101 serves as a port through which the potting compound is introduced to the coil assembly. A retainer 24a which is round and annular may be used, with an inner rim relieved at intervals and turned axially inward.

Figure 9:
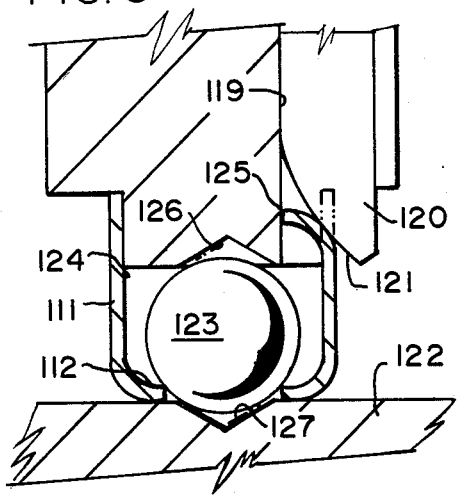
FIG. 9 is an enlarged fragmentary view in section, showing the tool of FIG. 8 being used both to cut and form the tangs from a cylindrical shell.
Figure 8:
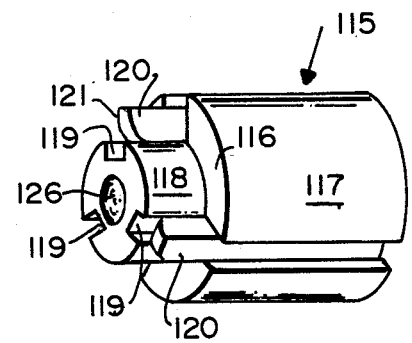
FIG. 8 is an isometric view of a tool for cutting and forming a tanged cage for the ball, like the cage shown in FIG. 1.
Figure 10:
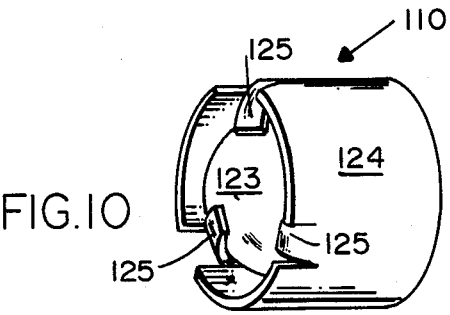
FIG. 10 is an isometric view of the resulting cage and ball assembly.

Formation of the Ball Cages (FIGS. 8–10)

While the cages 70 and 80 may be formed in various ways, FIGS. 8–10 show a particularly advantageous method and apparatus for making them, illustrating the formation of a ball cage 110. A thin-walled cylindrical member 111 (FIG. 9) has its seat at one end formed by a radially inwardly extending flange 112. As shown in FIG. 8 a forming tool body 115 is stepped by a shoulder 116 to provide a larger cylindrical portion 117 and a smaller cylindrical portion 118, both of which are provided with a series of three rectangular recesses 119, extending parallel to the axis, into each of which is fitted a blade 120. The recesses 119 (see FIG. 9) provide a space for the metal to go when the forming of the tangs takes place, and the blades 120 have forward curved end portions 121. As shown in FIG. 9, the member 111 may be seated on an anvil 122 with a ball 123 inside the member 111 and against the seat 112. The tool 115 holds most of the cylindrical wall 124 of the member 11 in place and in its cylindrical shape, while the blades 120 first cut and then form tangs 125. A conical recess 126 in the tool 115 and a conical recess 127 in the anvil 122 provide clearance for the ball 123. As shown, the recesses or reliefs 126 and 127 need not be conical or spherical so long as they give the needed clearances. The final result is shown in FIG. 10, where the three tangs 125 keep the ball 123 from falling out of the cage 110.

A Modified Formation of the Ball Cage

Figure 11:
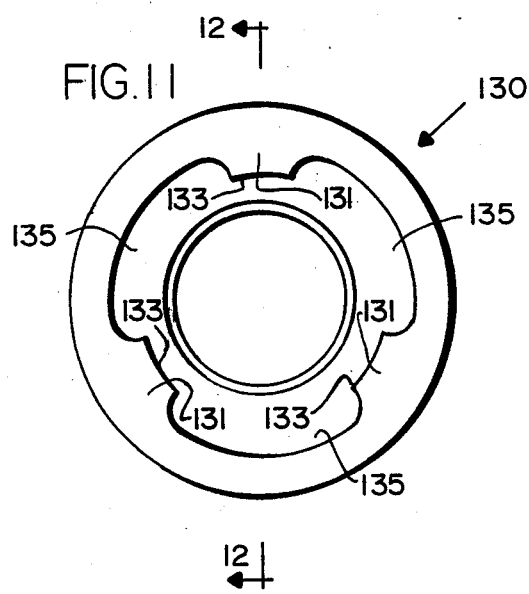
FIG. 11 is an end view of a modified form of ball cage.
Figure 12:
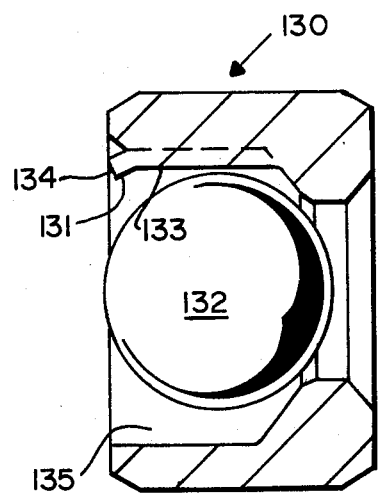
FIG. 12 is a view in section through the cage of FIG. 11, taken along the line 12—12 in FIG. 11, with the ball in place.

FIGS. 11 and 12 show a modified form of ball cage 130 having thicker walls at three guides 131 at local areas of smaller internal radius, to provide a guide for a ball 132, with inner cylindrical arc surfaces 133. This structure provides passages 135 between three local guides 131 for the flow of fluid around the ball 132. This particular cage 130 may be made by cold heading or by sintering or in some other way. A ring staking tool may be used to deform locally the three guide areas 131 (there may be four, if desired) in such a way as to make them serve as a retaining mechanism for the ball 132, as shown in FIG. 12, the inner diameter of the circle partly defined by the deformed portion of the arcs 133 being smaller than the diameter of the ball 132. In some cases, the inner diameter dimensions may be only slightly smaller than the diameter of the ball 132; then the staking may be accomplished before the ball 132 is installed, for after the portions 131 are formed, the ball 132 may be snapped into place with the stakes 131 springing back in to hold the ball 132 in place. If desired, the areas between the stakes 131 may be formed as deep recesses.

A Two-Way Valve (FIG. 13)

A normally open two-way valve of FIG. 13 includes a cylindrical tube 210 of non-magnetic material and a valve housing 211, most of which has been broken away. Around the tube 210 is a solenoid 212 comprising a nonmagnetic coil bobbin 213, around which is wound a coil 214, the bobbin 213 and coil 214 being encased in a thin-walled cylindrical steel casing or cover 215.

The solenoid 212 also includes a washer 216 at one end, abutting a vertical flange 217 of the coil bobbin 213; the casing is deformed or swaged to retain the washer 216 and hold the coil assembly together. A flange 218 at the other end abuts another vertical flange 219 of the coil bobbin 213. Rotational slippage between the casing 215 and the washer 216 is prevented by friction and by adhesion provided by a potting compound 220 that is used to bond the component parts together, hermetically seal the coil assembly and protect it from vibration, moisture and other contamination, while improving heat transfer from the coil 214 to the casing 215. An extension 221 of the bobbin flange 219 protrudes through an opening 222 through the casing flange 218 and assures alignment, as well as providing retention of coil lead wires 223 (Cf. FIG. 7). As in FIG. 6 there is a recess or relieved area 224 of the coil 214. A washer 225 is held in place by a retention ring 226.

The non-magnetic tube 210 has a central passage 230. A plunger 231 is movable in the central passage 230 between a non-magnetic, stationary end plug 232 seated at the end of the passage 230 and a magnetic guide plug or pole piece 233 adjacent to but spaced apart from the plunger 231. When the solenoid 212 is de-energized, there is a space between the plunger 231 and the guide plug 233, which is at least the length of the stroke of the plunger 231. The guide plug 233 has an axial passage 234 therethrough, and this has a wider portion 235.

A pin guide 237 with a passage 238 guides a plunger pin 240, which is retained by the plunger 231. This location of the pin guide 237 improves its guidance of the plunger pin 240 and reduces friction.

The valve housing 211 has a hollow interior comprising a smooth cylindrical bore 241 leading in from the inlet and which is connected by a frustoconical portion 42 to a wider interiorly threaded portion 243. Beyond that is a seal cavity portion 244, leading to an end wall 245 of the housing 211. A radial passage 246 leads into and out from the threaded portion 243. The bore 241 provides an axial passage.

A valve body 250 has a wall 251 abutting the washer 216 and a portion 252 which may engage the end wall 245 and has a threaded portion 253 threaded into the threads 243 and so extends into the hollow interior of the valve housing 211. A forward portion 255 of the body 250 has an exterior wall 256 slightly smaller than the bore 241 of the housing 211. This forward portion 255 is provided with a circumferential groove 257 for an O-ring 258 that seals against the bore 241.

The forward portion 255 is also provided with a smooth cylindrical bore 260 which is connected by a frustoconical wall 261 to a wider cylindrical bore 262, in which the pin guide 237 is retained and through which passages 265 lead to the passage 246. At a step 263, the bore 262 widens into a bore 264 in which the guide plug 233 fits snugly, the bore portion 264 having a diameter equal to that of the central passage 30 of the tube 10. The valve body 250 also has exterior threads 253 that engage the threads 243 of the housing. The walls 251 and 252 are part of a keyed head 266 that may be hexagonal, and there is enough space between the washer 216 and the shoulder 245 to insert a wrench that engages the head 266 for completing installation of the body 250 in the housing 211. A seal 267, preferably an O-ring fits in the space 244 between the head 266 and the threads 253, insuring sealing, so that there is no leakage between the body 250 and the housing 211 from the space around the passageways 265 that lead to the passage 246.

The solenoid 212 acts on the valve mechanism via the plunger pin 240, which is pressed into and forms a solid assembly with the plunger 231. The plunger pin 240 extends into the axial linear fluid passageway provided by the bore 260 in the valve body 250. Within the bore 260 is a ball valve cage 270 containing a cavity 271 in which is a ball 272. The ball cage 270 provides a valve seat 273 against which its ball 72 may be sealingly engaged. Thus, force due to solenoid energization applied through the plunger 231 and the plunger pin 240 to the ball 272 forces the ball 272 away from the seat 273, thereby enabling flow of fluid past the engaged valve seat 273. The ball cage 270 has tangs 276 which act to restrain the movement of the ball 272 within a short distance in the cavities 271.

As shown in FIG. 14, the plunger pin 240 has its end 275 that engages the ball 272 indented, as by a conical recess 276, thereby improving the positioning relations to the ball 272 during operation. The pin 40 may be similarly shaped.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A fast-response solenoid valve having a body with a plurality of successive separated openings inter-connected by a linear fluid pathway having at least one chamber lying between successive pairs of openings, said chamber having a movable ball and a ball seat, said valve also having a solenoid with a coil, a plunger which moves upon energization of the solenoid, a passage between said plunger and said ball, and a plunger pin in said passage with one end bearing against said ball, and its other end moved by said plunger when said solenoid is energized, movement of said plunger upon the energization of said solenoid causing said plunger pin to move said ball, said valve comprising:
a ball cage having a cylindrical exterior wall in snug engagement with the wall of said linear fluid passageway, a seat at one end, and a retaining portion at the other end,
said ball being retained in one said cage for limited axial movement between a said seat and a said retaining portion,
a cylindrical non-magnetic tube with an outer wall and an inner wall aligned with said linear fluid pathway, one end of said tube abutting a portion of said body, said tube having a distal end also,
a non-magnetic end plug held at a fixed position in said tube at its distal end, and
a magnetic guide plug held at a fixed position in said tube spaced away from said end plug and having a small-diameter hole therethrough providing said passage,
said solenoid plunger being in said tube and movable in between said plugs, and said plunger pin being in connection with said plunger.

2. The valve of claim 1 having
a coil bobbin having a cylindrical annular portion in snug contact with the outer wall of said tube and having first and second radial flanges at its ends,
a flat annular washer between and in firm engagement with said first flange and said head of said valve body,
said solenoid coil being wound around said bobbin in between said flanges and having leads extending out through said second flange,
said second flange having at least one protrusion on the side opposite from said first flange through which said leads pass,
a tubular casing having a cylindrical portion extending from said washer to and beyond said second flange and there provided with a radially inturned third flange, and
retaining means for retaining said third flange in engagement with said second flange and said first flange in engagement with said valve body.

3. The valve of claim 1 having
a coil bobbin having a cylindrical annular portion in snug contact with the outer wall of said tube and having first and second radial flanges at its ends,
a flat annular washer between and in firm engagement with said first flange and said head of said valve body,
said solenoid coil being wound around said bobbin in between said flanges and having leads extending out through said second flange,
a hollow spacer abutting said second flange and having hollow protrusions on the side opposite from said second flange through which said leads pass,
a tubular casing having a cylindrical portion extending from said washer to and beyond said second flange, and a radially inturned portion forming a third flange,
retaining means for retaining said third flange in engagement with said spacer and said spacer in engagement with said second flange.

4. A fast-response solenoid valve having a body with successive separated openings interconnected by a linear fluid pathway having a chamber lying between a successive pair of openings, said chamber having a movable ball and a ball seat, said valve also having a solenoid with a coil, a plunger which moves upon energization of the solenoid, a passage between said plunger and said ball, and a plunger pin in said passage with one end bearing against said ball, and its other end moved by said plunger when said solenoid is energized, movement of said plunger upon the energization of said solenoid causing said plunger pin to move said ball,
said valve comprising:
a cylindrical non-magnetic tube having an outer wall and an inner wall aligned with said linear fluid pathway, one end of said tube abutting a portion of said body, said tube having a distal end also,
a non-magnetic end plug held at a fixed position in said tube at its distal end,
a magnetic guide plug held at a fixed position in said tube spaced away from said end plug and having a small-diameter opening therethrough providing said passage,
said solenoid plunger being in said tube and movable in between said plugs, and said plunger pin being in connection with said plunger.

5. The valve of claim 4 having
a coil bobbin having a cylindrical annular portion in snug contact with the outer wall of said tube and having first and second radial flanges at its ends,
a flat annular washer between and in firm engagement with said first flange and said head of said valve body,
said solenoid coil being wound around said bobbin in between said flanges and having leads extending out through said second flange,
said second flange having at least one protrusion on the side opposite from said first flange through which said leads pass,
a tubular casing having a cylindrical portion extending from said washer to and beyond said second flange and there provided with a radially inturned third flange, and
retaining means for retaining said third flange in engagement with said second flange and said first flange in engagement with said valve body.

6. The valve of claim 4 having
a coil bobbin having a cylindrical annular portion in snug contact with the outer wall of said tube and having first and second radial flanges at its ends,
a flat annular washer between and in firm engagement with said first flange and said head of said valve body,
said solenoid coil being wound around said bobbin in between said flanges and having leads extending out through said second flange,
a hollow spacer abutting said second flange and having hollow protrusions on the side opposite from said second flange through which said leads pass,
a tubular casing having a cylindrical portion extending from said washer to and beyond said second flange and there provided with a radially inturned third flange, and
retaining means for retaining said third flange in engagement with said spacer and said spacer in engagement with said second flange.

7. The valve of claim 5 or 6 wherein said retaining means comprises:
a generally rectangular washer with arcuate ends bearing on said third flange and with an opening receiving said tube, and
a flat rectangular spring with an opening receiving said tube and having portions bearing on said generally rectangular washer.

8. A rapid-response, solenoid valve, including in combination:
- a valve housing having a hollow interior that provides successively wider first and second cylindrical bores, said first bore providing an axial opening at one end of said housing, a radial passage leading from said second bore, said second bore also including a threaded portion,
- a cylindrical valve body in said housing, having a hollow interior and an exterior wall stepped to provide successively wider first and second portions and a head, said first portion being only slightly smaller in diameter than said first bore and carrying sealing means for sealing against the respective said bore, said second portion being in threaded engagement with the threaded portion of said second bore and sealed to prevent leakage therebetween, said first body portion extending from said first bore into said second bore to provide an annular space there between said body and said housing and in between said sealing means and communicating with said radial passage,
- the hollow interior of said body having a first axial passage leading into said axial opening and a second axial passage widening out from said first axial passage and from which said radial passage leads,
- a ball cage located in said first axial passage, said cage having a cylindrical exterior wall in snug engagement with the wall of said first axial passage, a seat at one end, and a retainer portion at the other end,
- a ball retained in said cage for limited axial movement between a said seat and a said retainer portion,
- a cylindrical non-magnetic tube having an outer wall and an inner wall substantially the same diameter as said second axial passage, one end of said tube abutting the head of said body, said tube being axially aligned with said body and having a distal end also,
- a non-magnetic end plug held at a fixed position in said tube at its distal end,
- a magnetic guide plug held at a fixed position in said tube spaced away from said end plug and having a small-diameter passage therethrough,
- a solenoid plunger in said tube movable in between said plugs,
- a plunger pin in connection with said plunger, extending through said passage into contact with said ball,
- a coil bobbin having a cylindrical annular portion in snug contact with the outer wall of said tube and having first and second radial flanges at its ends,
- a flat annular washer between and in firm engagement with said first flange and said head of said valve body,
- a solenoid coil wound around said bobbin in between said flanges and having leads extending out through said second flange,
- said second flange having at least one protrusion on the opposite side from said flange through which said leads pass,
- a tubular casing having a cylindrical portion extending from said washer to and beyond said second flange and having a radially inturned portion providing a third flange, and
- retaining means for retaining said third flange in engagement with said second flange and said first flange in engagement with said body.

9. A fast-response three-way solenoid valve having a body with three successive separated openings interconnected by a linear fluid pathway having first and second chambers lying between successive pairs of openings, each chamber having a movable ball and a ball seat, a separator pin between and bearing against both said balls at substantially all times, said valve seats, balls, and separator pin being so related that when one said ball is seated against its seat the other ball is away from its seat, said valve also having a solenoid with a coil, a plunger which moves upon energization of the solenoid, a passage between said plunger and a nearer said ball, and a plunger pin in said passage with one end bearing against said nearer ball, and its other end moved by said plunger when said solenoid is energized, movement of said plunger upon the energization of said solenoid causing said plunger to move said plunger pin, in turn moving said nearer ball, said separator pin, and the further ball so that one of said balls is seated when the solenoid is energized and the other ball is seated when the solenoid is de-energized, said valve comprising:
- first and second ball cages located on opposite sides of one said opening, each said cage having a cylindrical exterior wall in snug engagement with the wall of said linear fluid passageway, a seat at one end, and a retaining portion at the other end, the seats of the two cages facing in opposite directions,
- each said ball being retained in one said cage for limited axial movement between a said seat and a said retaining portion,
- a cylindrical non-magnetic tube with an outer wall and an inner wall aligned with said linear fluid pathway, one end of said tube abutting a portion of said body, said tube having a distal end also,
- a non-magnetic end plug held at a fixed position in said tube at its distal end, and
- a magnetic guide plug held at a fixed position in said tube spaced away from said end plug and having a small-diameter hole therethrough providing said passage,
- said solenoid plunger being in said tube and movable in between said plugs, and said plunger pin being in connection with said plunger.

10. The valve of claim 9 having
- a coil bobbin having a cylindrical annular portion in snug contact with the outer wall of said tube and having first and second radial flanges at its ends,
- a flat annular washer between and in firm engagement with said first flange and said head of said valve body,
- said solenoid coil being wound around said bobbin in between said flanges and having leads extending out through said second flange,
- said second flange having at least one protrusion on the side opposite from said first flange through which said leads pass,
- a tubular casing having a cylindrical portion extending from said washer to and beyond said second flange and there provided with a radially inturned third flange, and
- retaining means for retaining said third flange in engagement with said second flange and said first flange in engagement with said valve body.

11. The valve of claim 9 having
- a coil bobbin having a cylindrical annular portion in snug contact with the outer wall of said tube and having first and second radial flanges at its ends, a flat annular washer between and in firm engagement with said first flange and said head of said valve body, said solenoid coil being wound around said bobbin in between said flanges and having leads extending out through said second flange, a hollow spacer abutting said second flange and having hollow protrusions on the side opposite from said second flange through which said leads pass, a tubular casing having a cylindrical portion extending from said washer to and beyond said second flange, and a radially inturned portion forming a third flange, retaining means for retaining said third flange in engagement with said spacer and said spacer in engagement with said second flange.

12. A fast-response three-way solenoid valve having a body with three successive separated openings interconnected by a linear fluid pathway having first and second chambers lying between successive pairs of openings, each with a movable ball and a ball seat, a separator pin between and bearing against both said balls at substantially all times, said valve seats, balls, and separator pin being so related that when one said ball is seated against its seat the other ball is away from its seat, said valve also having a solenoid with a coil, a plunger which moves upon energization of the solenoid, a passage between said plunger and a nearer said ball, and a plunger pin in said passage with one end bearing against said nearer ball, and its other end moved by said plunger when said solenoid is energized, movement of said plunger upon the energization of said solenoid causing said plunger to move said plunger pin, in turn moving said nearer ball, said separator pin, and the further ball so that one of said balls is seated when the solenoid is energized and the other ball is seated when the solenoid is de-energized, said valve comprising:

a cylindrical non-magnetic tube having an outer wall and an inner wall aligned with said linear fluid pathway, one end of said tube abutting a portion of said body, said tube having a distal end also, a non-magnetic end plug held at a fixed position in said tube at its distal end, a magnetic guide plug held at a fixed position in said tube spaced away from said end plug and having a small-diameter opening therethrough providing said passage, said solenoid plunger being in said tube and movable in between said plugs, and said plunger pin being in connection with said plunger.

13. The valve of claim 12 having a coil bobbin having a cylindrical annular portion in snug contact with the outer wall of said tube and having first and second radial flanges at its ends, a flat annular washer between and in firm engagement with said first flange and said head of said valve body, said solenoid coil being wound around said bobbin in between said flanges and having leads extending out through said second flange, said second flange having at least one protrusion on the side opposite from said first flange through which said leads pass, a tubular casing having a cylindrical portion extending from said washer to and beyond said second flange and there provided with a radially inturned third flange, and retaining means for retaining said third flange in engagement with said second flange and said first flange in engagement with said valve body.

14. The valve of claim 12 having a coil bobbin having a cylindrical annular portion in snug contact with the outer wall of said tube and having first and second radial flanges at its ends, a flat annular washer between and in firm engagement with said first flange and said head of said valve body, said solenoid coil being wound around said bobbin in between said flanges and having leads extending out through said second flange, a hollow spacer abutting said second flange and having hollow protrusions on the side opposite from said second flange through which said leads pass, a tubular casing having a cylindrical portion extending from said washer to and beyond said second flange and there provided with a radially inturned third flange, and retaining means for retaining said third flange in engagement with said spacer and said spacer in engagement with said second flange.

15. The valve of claim 14 wherein said retaining means comprises:

a generally rectangular washer with arcuate ends bearing on said third flange and with an opening receiving said tube, and a flat rectangular spring with an opening receiving said tube and having portions bearing on said generally rectangular washer.

16. A rapid-response, three-way solenoid valve, including in combination:

a valve housing having a hollow interior that provides successively wider first, second, and third cylindrical bores, said first bore providing an axial opening at one end of said housing, first and second radial passages leading respectively from said second and third bores, said third bore including a threaded portion, a cylindrical valve body in said housing, having a hollow interior and an exterior wall stepped to provide successively wider first, second, and third portions and a head, said first and second portions being only slightly smaller in diameter than said first and second bores and each carrying sealing means for sealing against the respective said bore, said third portion being in threaded engagement with the threaded portion of said third bore and sealed to prevent leakage therebetween, said first body portion extending from said first bore into said second bore to provide a first annular space therebetween said body and said housing and in between said sealing means and communicating with said first radial passage, there being a third radial passage leading from the hollow interior of said valve body into said first annular space, said second body portion extending from said second bore into said third bore to provide there a second annular space communicating with said second radial passage, there being a fourth radial passage leading from the hollow interior of said valve body into said second annular space, the hollow interior of said body having a first axial passage leading into said axial opening and from which said first radial passage leads, a second axial passage widening out from said first axial passage and from which said second radial passage leads, and a third still wider axial passage joined to said second axial passage by an annular step, first and second ball cages located at opposite ends of said first axial passage and on opposite sides of said first radial passage, each said cage having a cylindrical exterior wall in snug engagement with the wall of said first axial passage, a seat at one end, and a retainer portion at the other end, the seats of the two cages facing in opposite directions, first and second balls, respectively in said first and second cages and retained there for limited axial movement between a said seat and a said retainer portion, a separator pin in said first axial passage in between and bearing on both said balls, a cylindrical non-magnetic tube having an outer wall and an inner wall substantially the same diameter as said third axial passage, one end of said tube abutting the head of said body, said tube being axially aligned with said body and having a distal end also, a non-magnetic end plug held at a fixed position in said tube at its distal end, a magnetic guide plug held at a fixed position in said tube spaced away from said end plug and having a small-diameter passage therethrough, a solenoid plunger in said tube movable in between said plugs, a plunger pin in connection with said plunger, extending through said guide passage into contact with said second ball, a coil bobbin having a cylindrical annular portion in snug contact with the outer wall of said tube and having first and second radial flanges at its ends, a flat annular washer between and in firm engagement with said first flange and said head of said valve body, a solenoid coil wound around said bobbin in between said flanges and having leads extending out through said second flange, a hollow spacer abutting said second flange and having hollow protrusions on the opposite side from said second flange through which said leads pass, and a tubular casing having a cylindrical portion extending from said washer to and beyond said second flange and having a radially inturned portion providing a third flange, and retaining means for retaining said third flange in engagement with said spacer and spacer in engagement with said second flange.

17. The valve of claim 16 having separator pin guide means in said first axial passage and bearing on the wall thereof, for holding said pin in correct alignment.

18. A rapid-response, three-way solenoid valve, including in combination:

a valve housing having a hollow interior that provides successively wider first, second, and third cylindrical bores, said first bore providing an axial opening at one end of said housing, first and second radial passages leading respectively from said second and third bores, said third bore including a threaded portion, a cylindrical valve body in said housing, having a hollow interior and an exterior wall stepped to provide successively wider first, second, and third portions and a head, said first and second portions being only slightly smaller in diameter than said first and second bores and each carrying sealing means for sealing against the respective said bore, said third portion being in threaded engagement with the threaded portion of said third bore and sealed to prevent leakage therebetween, said first body portion extending from said first bore into said second bore to provide a first annular space therebetween said body and said housing and in between said sealing means and communicating with said first radial passage, there being a third radial passage leading from the hollow interior of said valve body into said first annular space, said second body portion extending from said second bore into said third bore to provide there a second annular space communicating with said second radial passage, there being a fourth radial passage leading from the hollow interior of said valve body into said second annular space, the hollow interior of said body having a first axial passage leading into said axial opening and from which said first radial passage leads, a second axial passage widening out from said first axial passage and from which said second radial passage leads, and a third still wider axial passage joined to said second axial passage by an annular step, first and second ball cages located at opposite ends of said first axial passage and on opposite sides of said first radial passage, each said cage having a cylindrical exterior wall in snug engagement with the wall of said first axial passage, a seat at one end, and a retainer portion at the other end, the seats of the two cages facing in opposite directions, first and second balls, respectively in said first and second cages and retained there for limited axial movement between a said seat and a said retainer portion, a separator pin in said first axial passage in between and bearing on both said balls, a cylindrical non-magnetic tube having an outer wall and an inner wall substantially the same diameter as said third axial passage, one end of said tube abutting the head of said body, said tube being axially aligned with said body and having a distal end also, a non-magnetic end plug held at a fixed position in said tube at its distal end, a magnetic guide plug held at a fixed position in said tube spaced away from said end plug and having a small-diameter passage therethrough, a solenoid plunger in said tube movable in between said plugs, a plunger pin in connection with said plunger, extending through said guide passage into contact with said second ball, a coil bobbin having a cylindrical annular portion in snug contact with the outer wall of said tube and having first and second radial flanges at its ends, a flat annular washer between and in firm engagement with said first flange and said head of said valve body, a solenoid coil wound around said bobbin in between said flanges and having leads extending out through said second flange, said second flange having at least one protrusion on the side opposite from said first flange through which said leads pass, a tubular casing having a cylindrical portion extending from said washer to and beyond said second flange and there provided with a radially inturned portion third flange, and retaining means for retaining said third flange in engagement with said second flange and said first flange in engagement with said valve body.

19. The valve of claim 18 having
separator pin guide means in said first axial passage and bearing on the wall thereof, for holding said pin in correct alignment.

* * * * *